(12) United States Patent
Ogawa et al.

(10) Patent No.: US 10,650,366 B2
(45) Date of Patent: May 12, 2020

(54) REGISTRATION SETTLEMENT APPARATUS

(71) Applicant: TOSHIBA TEC KABUSHIKI KAISHA, Shinagawa-ku, Tokyo (JP)

(72) Inventors: Yuichi Ogawa, Izunokuni Shizuoka (JP); Takashi Muraoka, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/509,636

(22) Filed: Jul. 12, 2019

(65) Prior Publication Data
US 2020/0027070 A1    Jan. 23, 2020

(30) Foreign Application Priority Data
Jul. 20, 2018  (JP) .................................. 2018-136667

(51) Int. Cl.
*G06Q 20/20* (2012.01)
*A47F 9/04* (2006.01)

(52) U.S. Cl.
CPC ........... *G06Q 20/204* (2013.01); *A47F 9/046* (2013.01); *G06Q 20/206* (2013.01); *G06Q 20/208* (2013.01)

(58) Field of Classification Search
CPC .. G06Q 20/204; G06Q 20/206; G06Q 20/208; A47F 9/046
USPC ........................................................ 235/383
See application file for complete search history.

(56) References Cited

U.S. PATENT DOCUMENTS

| | | | |
|---|---|---|---|
| 9,123,037 B2* | 9/2015 | Dismukes | G06Q 20/204 |
| 2004/0069848 A1* | 4/2004 | Persky | A47F 9/048 |
| | | | 235/383 |
| 2007/0187482 A1* | 8/2007 | Castro | G06Q 20/20 |
| | | | 235/379 |
| 2015/0199882 A1* | 7/2015 | Fernando | G07G 1/0018 |
| | | | 345/173 |

FOREIGN PATENT DOCUMENTS

JP         2010-86202        4/2010

* cited by examiner

*Primary Examiner* — Michael G Lee
*Assistant Examiner* — David Tardif
(74) *Attorney, Agent, or Firm* — Amin, Turocy & Watson, LLP (57) ABSTRACT

A registration settlement apparatus comprises a first determining module configured to determine contents of a transaction in response to an operation by a first operator; a second determining module configured to determine contents of the transaction in response to an operation by a second operator facing the first operator across the registration settlement apparatus; a determination control module configured to enable one of the first and second determining modules, and to switch to the determining module enabled for the determination on contents of a transaction started thereafter in response to a button operation by the second operator before the determination on contents of one transaction is started; and a settlement module configured to perform a settlement processing of calculating a settlement amount based on the contents of the transaction determined by the determining module enabled, and settling the calculated settlement amount in response to an operation by the first operator.

20 Claims, 7 Drawing Sheets

REGISTRATION SETTLEMENT APPARATUS

CROSS-REFERENCE TO RELATED APPLICATION

This application is based upon and claims the benefit of priority from Japanese Patent Application No. 2018-136667, filed on Jul. 20, 2018, the entire contents of which are incorporated herein by reference.

FIELD

Embodiments described herein relate generally to a registration settlement apparatus.

BACKGROUND

In a well-known self-service type registration settlement apparatus, a customer performs both an operation of registering contents of a transaction such as registering a purchased commodity to a commodity list and a settlement operation of the transaction.

However, if the customer is unfamiliar with such a self-service type apparatus and cannot perform the registration operation, or if the purchased commodity is not permitted to be sold by the registration operation performed only by the customer, it is necessary for a store clerk to perform the registration operation.

For these reasons, an apparatus is desirable to be capable of easily switching a so-called full self-service state in which various kinds of operation from registration to settlement are performed by the customer and a so-called semi-self-service state in which the registration operation is performed by the store clerk and the settlement operation is performed by the customer.

DETAILED DESCRIPTION

In accordance with an embodiment, a registration settlement apparatus comprises a first determining module configured to determine contents of a transaction to be settled in response to an operation performed by a first operator; a second determining module configured to determine contents of the transaction in response to an operation performed by a second operator facing the first operator across the registration settlement apparatus; a determination control module configured to control the first determining module and the second determining module so as to enable either one of the first determining module and the second determining module, and to switch to the determining module that is enabled for the determination of contents of a transaction started thereafter in response to a button operation by the second operator before the determination of contents of one transaction is started; and a settlement module configured to perform a settlement processing of calculating a settlement amount based on the contents of the transaction determined by the first or second determining module enabled by the determination control module, and settling the calculated settlement amount in response to an operation performed by the first operator.

An embodiment is described below with reference to the accompanying drawings. In the present embodiment, a POS (Point-Of-Sale) terminal is described as an example of a registration settlement apparatus.

Figure 1:
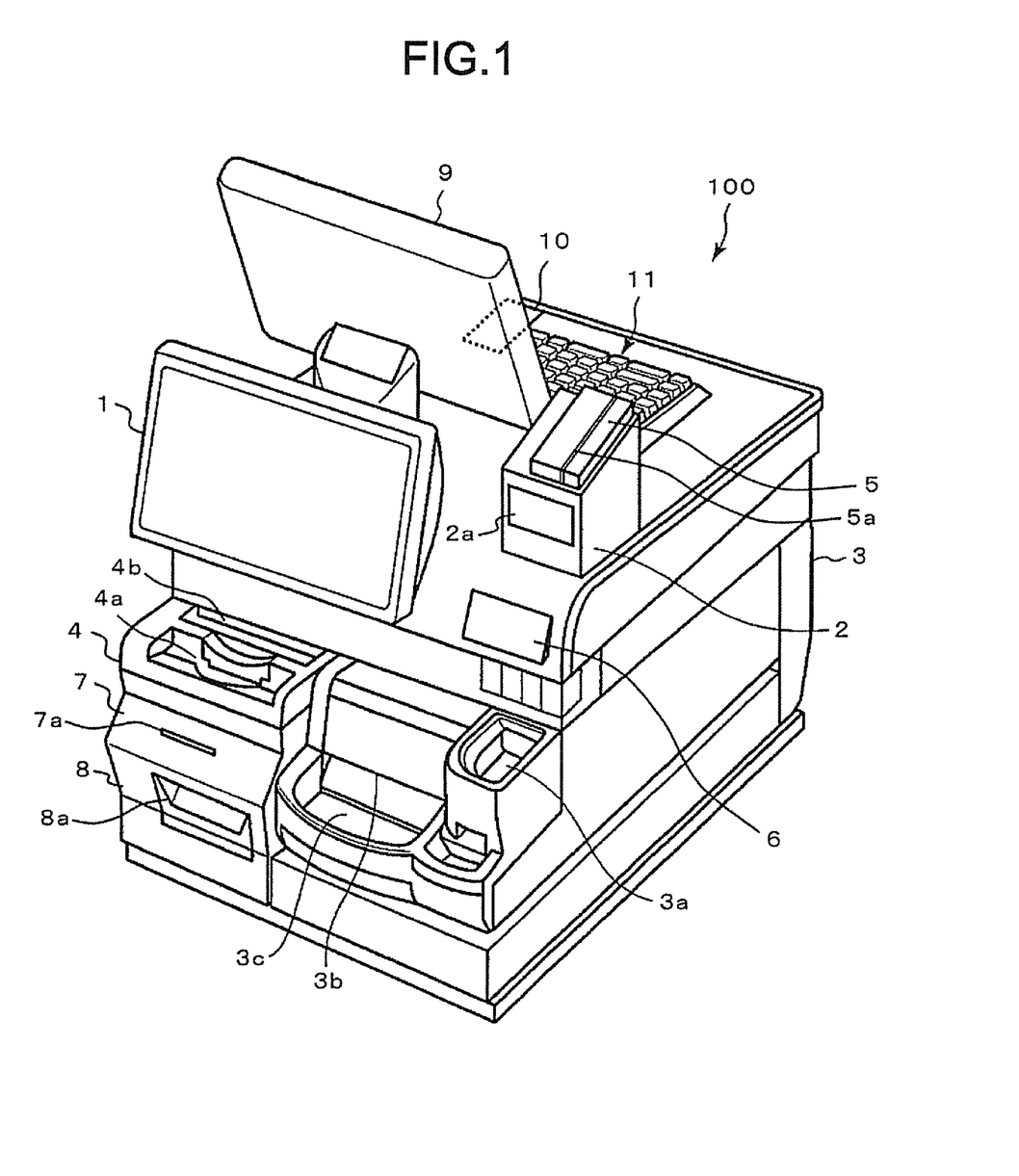
FIG. 1 is a perspective view illustrating an external appearance of a POS terminal according to an embodiment.

FIG. 1 is a perspective view illustrating an external appearance of a POS terminal 100 according to the present embodiment.

The POS terminal 100 is installed on a register counter provided to separate a work space of a store clerk and a sales floor. The POS terminal 100 is operated by the store clerk and the customer. The store clerk who operates the POS terminal 100 is present on the right rear side in FIG. 1. The customer who operates the POS terminal 100 is present on the left front side in FIG. 1. Therefore, in the following description, the right rear side and the left front side in FIG. 1 are referred to as a store clerk side and a customer side, respectively.

The POS terminal 100 includes a touch panel for customer 1, a fixed scanner 2, a coin unit 3, a bill unit 4, a credit card reader 5, a near field communication unit 6, a prepaid card reader/writer (prepaid card R/W) 7, a receipt printer 8, a touch panel for store clerk 9, a sub touch panel 10 and a keyboard 11.

The touch panel for customer 1 is provided towards the customer side as shown in FIG. 1. The touch panel for customer 1 displays a screen for providing information to a customer. The touch panel for customer 1 receives an instruction input through a touch operation on the screen by the customer. The touch panel for customer 1 is an example of a first operation device and a first display device.

The fixed scanner 2 has a reading window 2a oriented to the customer side. The fixed scanner 2 photographs a commodity held in front of the reading window 2a to recognize barcode information indicated by a barcode attached to the commodity by performing an image processing. Then, the fixed scanner 2 outputs the recognized barcode information to a processor 12 described later. The fixed scanner 2 may be another type of well-known device such as a device optically reading a barcode, using the reflection of a laser beam. The fixed scanner 2 may also be a well-known device having a function of designating a commodity from an image of the commodity obtained by photographing the commodity, using an object recognition technology. The fixed scanner 2 is an example of the first operation device.

The coin unit 3 includes a coin insertion slot 3a, a coin discharge port 3b and a coin tray 3c. The coin insertion slot 3a is formed in such a manner that coins can be inserted from the customer side. The coin unit 3 accommodates coins inserted from the coin insertion slot 3a in an internal storage while calculating the amount of coins. The coin unit 3 discharges coins accommodated in the storage to the coin tray 3c via the coin discharge port 3b. The coin tray 3c is formed in such a manner that coins can be taken out from the customer side.

The bill unit 4 includes a bill insertion slot 4a and a bill discharge port 4b. The bill insertion slot 4a is formed in such a manner that bills can be inserted from the customer side. The bill unit 4 accommodates bills in the internal storage while calculating the amount of bills inserted from the bill insertion slot 4*a*. The bill unit 4 discharges bills accommodated in the storage from the bill discharge port 4*b*. The bill discharge port 4*b* holds the discharged bill in a state in which a part thereof is exposed to the outside. The bill discharge port 4*b* is formed in such a manner that the bill held as described above can be taken out from the customer side.

The credit card reader 5 reads card information from a credit card slid along a slit 5*a*. The credit card reader 5 is arranged in such a manner that the slit 5*a* faces the customer so that it is suitable for a customer present on the customer side to slide the credit card.

The near field communication unit 6 is provided to form a communication range on the customer side. The near field communication unit 6 carries out a near filed wireless communication with a wireless tag in proximity from the customer side to acquire data stored in the wireless tag. The near field communication unit 6 writes information to the wireless tag through the above near field wireless communication.

The prepaid card reader/writer 7 includes a slot 7*a*. The prepaid card reader/writer 7 reads card data magnetically recorded on a prepaid card inserted in the slot 7*a*. The prepaid card reader/writer 7 writes data to the prepaid card inserted in the slot 7*a*.

The receipt printer 8 prints a receipt image on a receipt paper. The receipt printer 8 discharges the receipt paper on which the receipt image is printed from a receipt discharge port 8*a* to the outside.

The touch panel for store clerk 9 is provided towards the store clerk side. The touch panel for store clerk 9 displays a screen for providing information to a store clerk. The touch panel for store clerk 9 receives an instruction input through a touch operation on the screen by the store clerk. The touch panel for store clerk 9 is an example of a second operation device and a second display device.

The sub touch panel 10 is provided towards the store clerk side. The sub touch panel 10 displays a screen for providing information to the store clerk. The sub touch panel 10 receives an instruction input through a touch operation on the screen by the store clerk. The sub touch panel 10 is an example of the second operation device and the second display device.

The keyboard 11 includes a large number of keys so that the store clerk present on the store clerk side can perform a press operation easily. The keyboard 11 receives an instruction of the store clerk input through pressing these keys. The keyboard 11 is an example of the second operation device.

Figure 2:
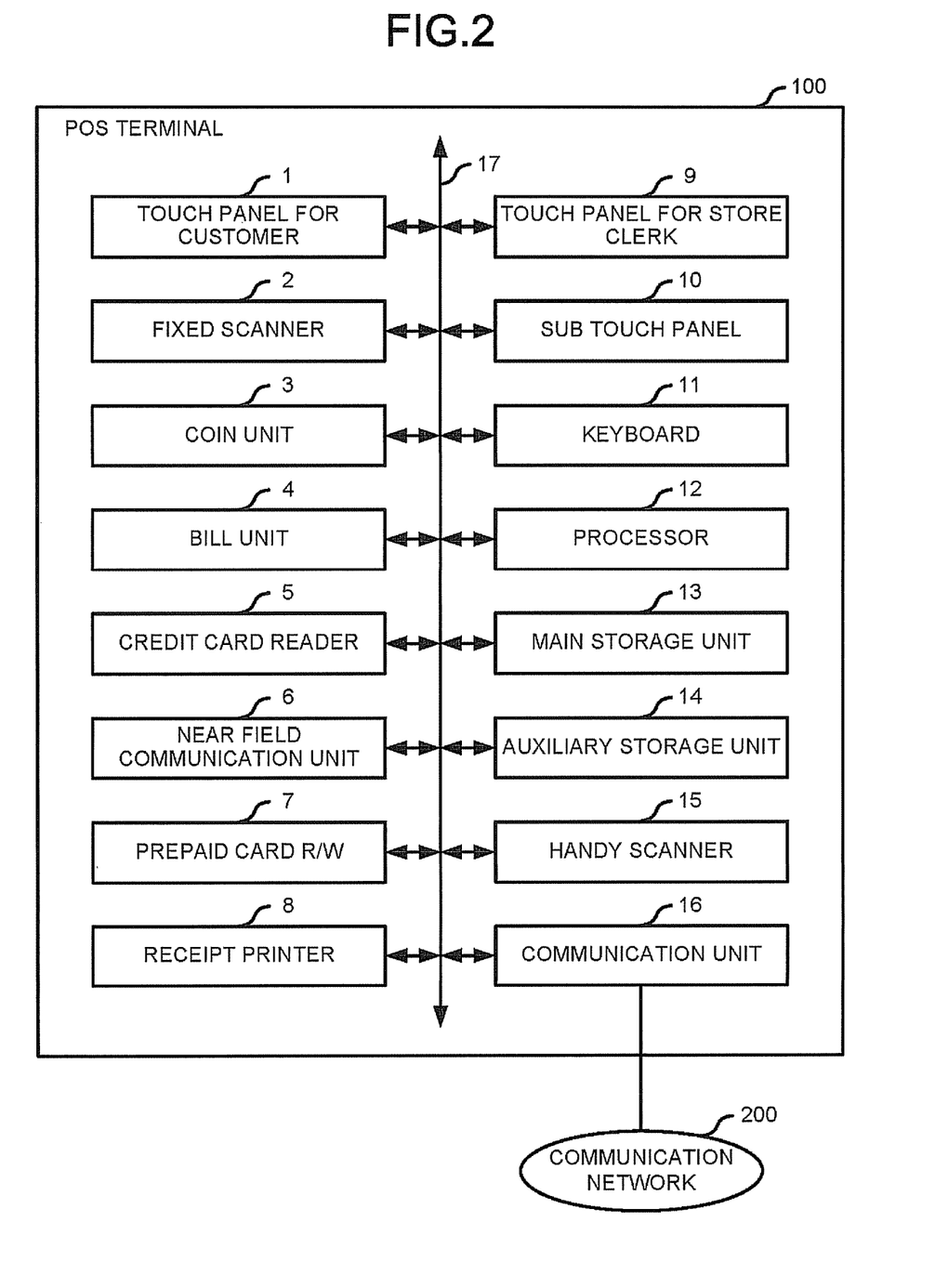
FIG. 2 is a block diagram illustrating a circuit configuration of main elements of the POS terminal shown in FIG. 1.

FIG. 2 is a block diagram illustrating circuit configuration of main elements of the POS terminal 100. In FIG. 2, the same or similar components as those shown in FIG. 1 are denoted with the same reference numerals as those in FIG. 1, and a detailed description thereof is omitted.

In addition to the components also shown in FIG. 1, the POS terminal 100 further includes the processor 12, a main storage unit 13, an auxiliary storage unit 14, a handy scanner 15, a communication unit 16 and a transmission line 17.

The components also shown in FIG. 1, the processor 12, the main storage unit 13, the auxiliary storage unit 14, the handy scanner 15 and the communication unit 16 are connected to the transmission line 17.

The processor 12, the main storage unit 13 and the auxiliary storage unit 14 connected via the transmission line constitute a computer that executes an information processing for controlling the POS terminal 100.

The processor 12 acts as a central element of the computer. The processor 12 executes information processing programs such as application programs and middle ware stored in the main storage unit 13 and the auxiliary storage unit 14 according to an operating system to control each section of the POS terminal 100 to implement various functions of the POS terminal 100.

The main storage unit 13 acts as a main memory element of the computer. The main storage unit 13 includes a nonvolatile memory area and a volatile memory area. The main storage unit 13 stores the above information processing programs in the nonvolatile memory area. The main storage unit 13 may also store data necessary for the processor 12 to execute various types of information processing in the nonvolatile area or the volatile memory area. The main storage unit 13 uses the volatile memory area as a work area where data is appropriately rewritten by the processor 12.

The auxiliary storage unit 14 acts as an auxiliary storage element of the computer. The auxiliary storage unit 14 is, for example, an EEPROM (Electric Erasable Programmable Read-Only Memory), an HDD (Hard Disc Drive), an SSD (Solid State Drive), or the like. The auxiliary storage unit 14 stores data used by the processor 12 to perform various types of information processing and data generated in a processing performed by the processor 12. The auxiliary storage unit 14 may also store the above information processing program.

The handy scanner 15 is held by an operator to optically read a barcode facing a reading port thereof. The handy scanner 15 outputs barcode information indicated by the read barcode to the processor 12.

The communication unit 16 performs communication processing through which the processor 12 transmits and receives various kinds of data to and from a device such as a POS server via the communication network 200. Typically, the communication network 200 is a LAN (Local Area Network). However, in addition to the LAN, the communication network 200 may be one or an appropriate combination of the Internet, a VPN (Virtual Private Network), a public communication network, a mobile communication network, and the like. The communication unit 16 may be a well-known device conforming to a communication system of the communication network 200.

The transmission path 17 includes an address bus, a data bus, a control signal line, and the like. The transmission path 17 transmits data and signals transmitted and received between the connected sections.

The hardware of an existing POS terminal may be used as the basic hardware of the POS terminal 100, for example. The POS terminal 100 is generally transferred in a state in which the information processing program for implementing the information processing described later is stored in the main storage unit 13 or the auxiliary storage unit 14. However, the information processing program is not stored in the main storage unit 13 or the auxiliary storage unit 14 beforehand, and the hardware of the POS terminal 100 and the information processing program may be separately transferred. In this case, the information processing program may be written in the main storage unit 13 or the auxiliary storage unit 14 in response to an operation by an administrator of the POS terminal 100. The information processing program may be transferred by recording it on a removable recording medium such as a magnetic disk, a magneto-optical disk, an optical disk, a semiconductor memory, etc., or with communication via the network.

Next, the operation performed by the POS terminal 100 configured as described above is described.

When the POS terminal 100 is started in an operation mode for registration and settlement, the processor 12 performs an information processing described below by executing the information processing program stored in the main storage unit 13 or the auxiliary storage unit 14.

Figure 3:
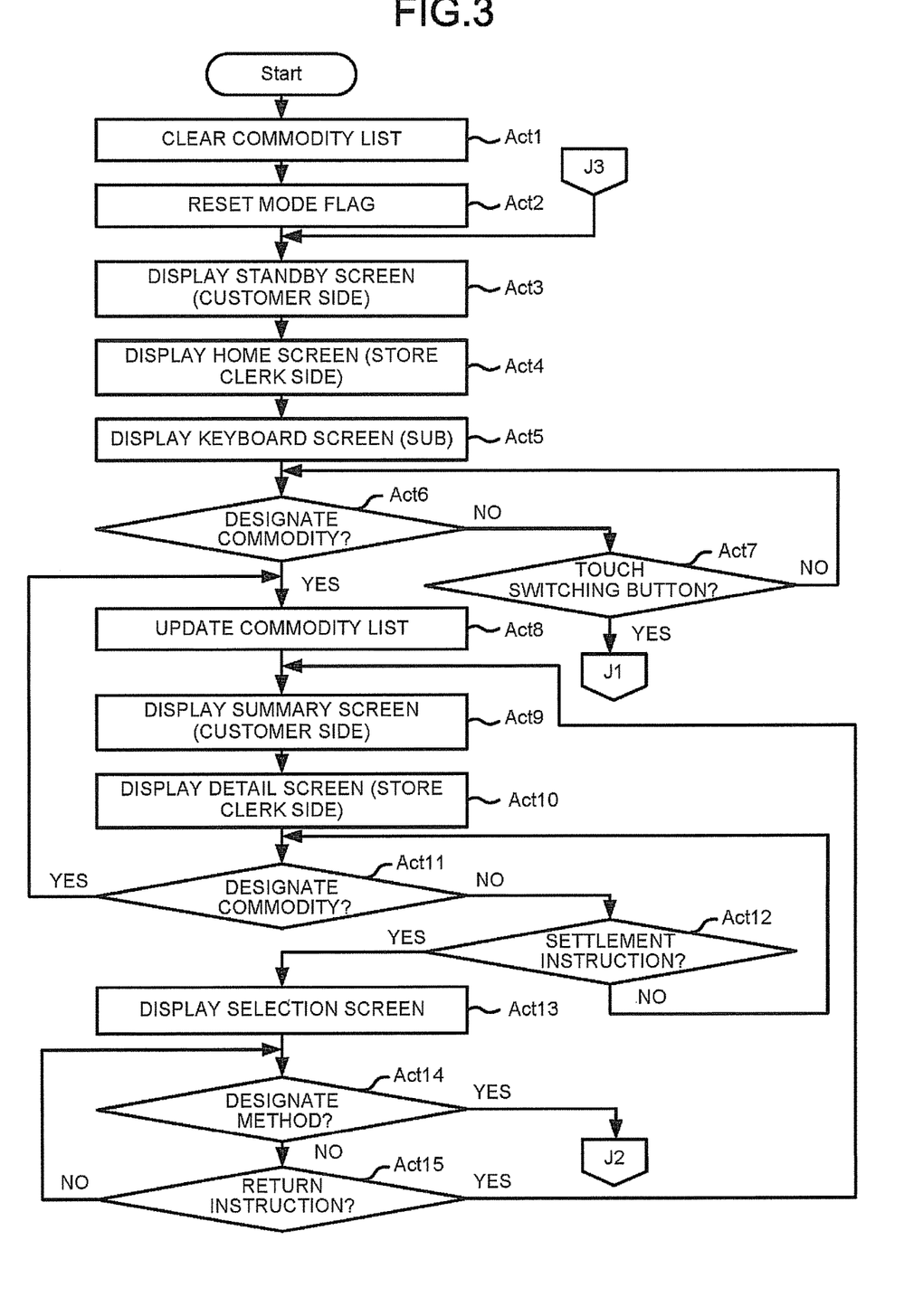
FIG. 3 is a flowchart depicting an information processing performed by a processor in FIG. 2.
Figure 4:
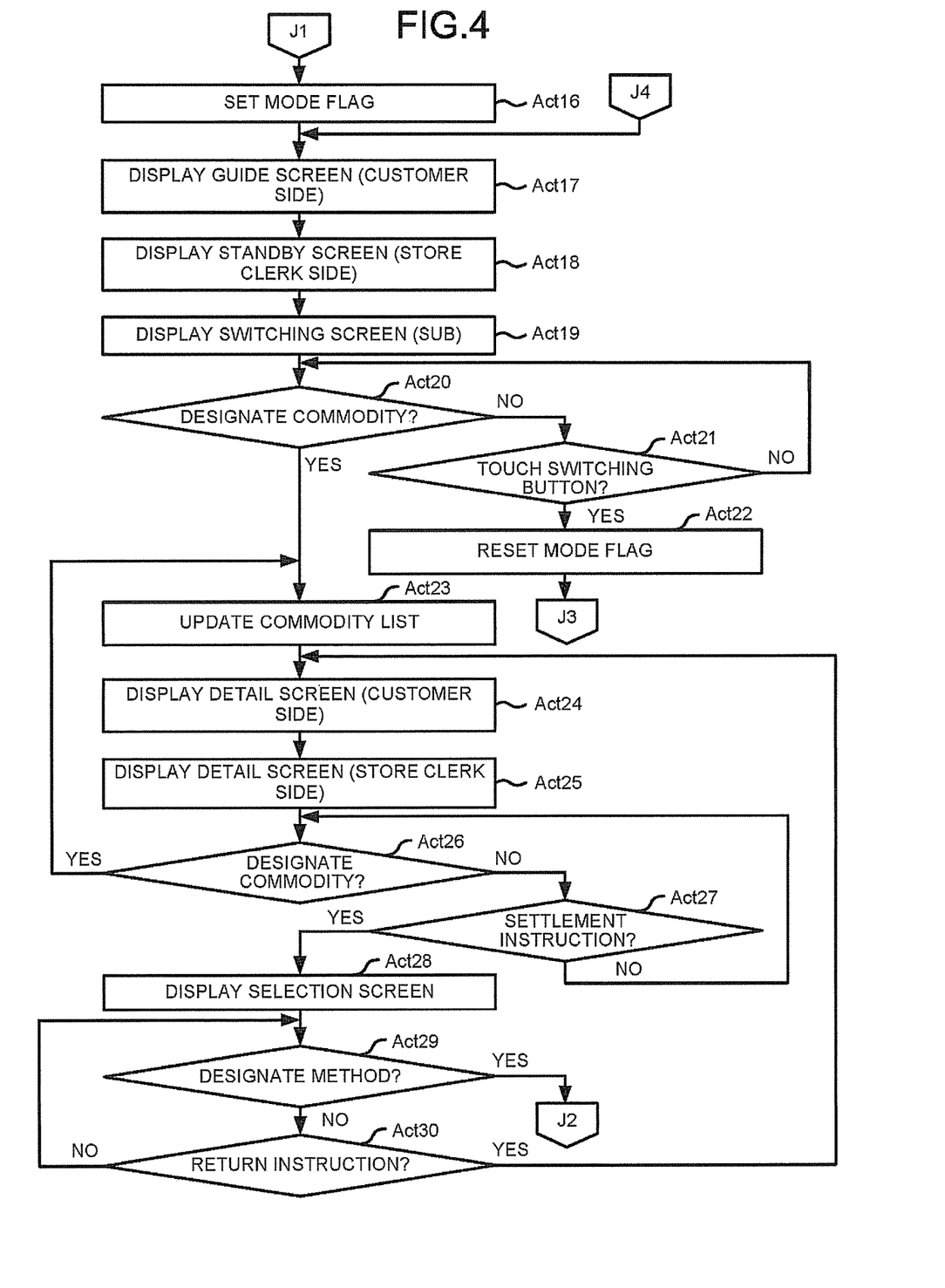
FIG. 4 is a flowchart depicting an information processing performed by the processor in FIG. 2.
Figure 5:
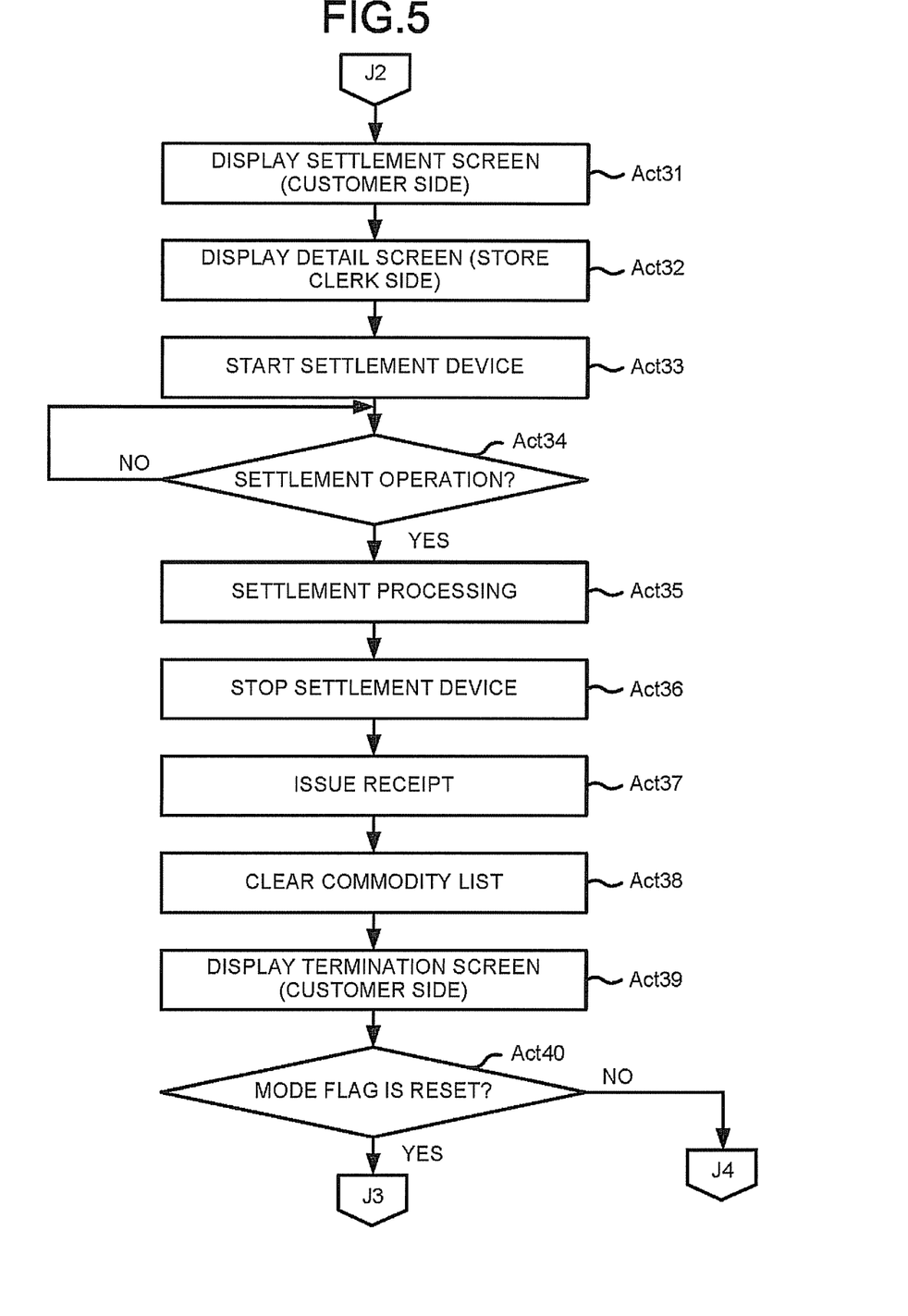
FIG. 5 is a flowchart depicting an information processing performed by the processor in FIG. 2.

FIG. 3, FIG. 4 and FIG. 5 are flowcharts depicting an information processing performed by the processor 12. The contents of the processing described below are merely examples, and an appropriately change in an order of a part of processing, omission of a part of processing or addition of another processing may be performed.

In Act 1, the processor 12 clears contents of a commodity list. The commodity list includes data showing a list of registered commodities as purchased commodities. The commodity list is stored in the main storage unit 13 or the auxiliary storage unit 14.

In Act 2, the processor 12 resets a mode flag. The mode flag indicates that a semi-self-service mode is applied in a reset state thereof, or that a full self-service mode is applied in a set state thereof. The mode flag is stored in the main storage unit 13 or the auxiliary storage unit 14. Specifically, the processor 12 sets the semi-self-service mode immediately after the start of the operation in the above-described operation mode. As described later, in the semi-self-service mode, the operation by the operator or cashier (store clerk) is not limited as compared with in the full self-service mode.

In Act 3, the processor 12 controls the touch panel for customer 1 to display a standby screen. Although any contents may be displayed on the standby screen, it is assumed in the present embodiment that an advertisement screen is displayed. The standby screen does not include an operation element for registering a purchased commodity.

In Act 4, the processor 12 controls the touch panel for store clerk 9 to display a home screen. The home screen is a basic screen for the store clerk to perform operation of registering a purchased commodity. The store clerk can perform operations to designate a commodity as the purchased commodity on the home screen or on another screen that can be transitioned from the home screen.

In Act 5, the processor 12 controls the sub touch panel 10 to display a keyboard screen. The keyboard screen shows a software keyboard on which a plurality of images (hereinafter, referred to as buttons) each imitating a button is arranged. Various functions are allocated to the plurality of buttons respectively, and these buttons serve as operators for designating the allocated functions.

Figure 6:
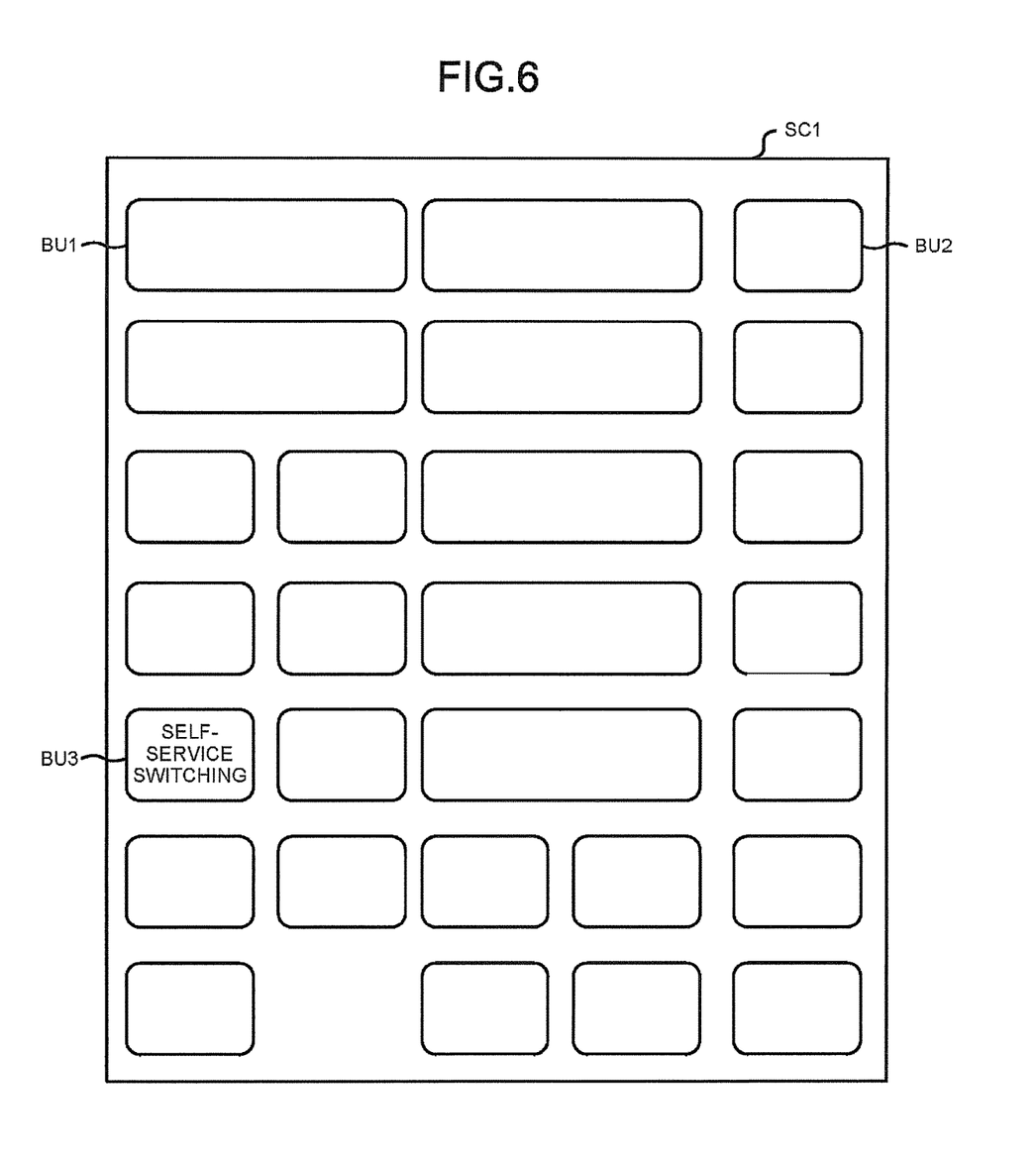
FIG. 6 is a view illustrating a keyboard screen.

FIG. 6 shows an example of the keyboard screen SC1.

In the keyboard screen SC1, a plurality of buttons such as a button BU1 and a button BU2 are arranged. Although not donated by reference symbols, those having the same shape as the button BU1 or the button BU2 are also buttons.

Functions are allocated to the respective buttons on the keyboard screen SC1 in advance. A switching button BU3 is assigned with a function of instructing to switch to the full self-service mode by an operator. A character string "self-service switching" is displayed on the switching button BU3 to show the allocated function. A character string indicating the function allocated to each button is also displayed on each of the other buttons, but such character string is not shown in FIG. 6.

In Act 6, the processor 12 determines whether or not a commodity to be registered as a purchased commodity is designated. Then, if no commodity is designated, the processor 12 takes No, and thus proceeds to the processing in Act 7.

In Act 7, the processor 12 determines whether or not the switching button BU3 is touched. Then, if it is determined that the switching button BU3 is not touched, the processor 12 takes No and thus returns to the processing in Act 6.

Thus, the processor 12 stands by until a commodity is designated in Act 6 or the switching button BU3 is touched in Act 7.

In the standby state described above and the standby state described below, the processor 12 may also determine whether or not another instruction operation is made. If it is determined that such an instruction operation is made, the processor 12 performs a processing corresponding to the instruction operation.

The customer picks up a commodity to be purchased from the sales shelf or showcase and brings it to the register counter. The store clerk who operates the POS terminal 100 is present on a workspace side facing a customer present on the opposite side across the POS terminal 100. The store clerk performs an operation for designating the commodity that the customer brings to the register counter as the purchased commodity, using the touch panel for store clerk 9 and the handy scanner 15. The operation of the store clerk at this time may be the same as that performed on existing well-known POS terminal. If the operation for designating the commodity as the purchased commodity is performed, the processor 12 takes Yes in Act 6, and proceeds to the processing in Act 8.

Since the standby screen does not include an operation element for registering the purchased commodity as described above, the operation for designating the commodity as the purchased commodity is not performed through the touch panel for customer 1. The processor 12 does not use the recognition result of the fixed scanner 2 in the registration of the purchased commodity. In other words, in the semi-self-service mode in which the processor 12 determines the contents of a transaction to be settled in response to an operation performed by the store clerk serving as the second operator, the touch panel for customer 1 and the fixed scanner 2 acting as the first operation devices are disabled. Thus, by executing the information processing according to the information processing program by the processor 12, the computer having the processor 12 as the central element functions as a disablement module. Since the touch panel for customer 1 and the fixed scanner 2 are disabled in this way, erroneous registration of the purchased commodity by the operation of the customer can be prevented.

In Act 8, the processor 12 updates the commodity list to include the commodity designated by the above operation. The commodity list includes, for example, commodity codes for identifying commodities. Accordingly, the processor 12 adds a commodity code for identifying the designated commodity to the commodity list.

In Act 9, the processor 12 controls the touch panel for customer 1 to display a summary screen. The summary screen shows the summary of the current state of the registration of the purchased commodity according to the contents of the commodity list as of this time. The summary screen shows, for example, a commodity name, unit price and quantity of the commodity registered as the purchased commodity just before, a total amount of discount applied to the registered commodity, and a total amount of the registered commodity. The summary screen does not include an operation element for registering the purchased commodity.

In Act 10, the processor 12 controls the touch panel for store clerk 9 to display a detail screen. The detail screen shows the details of the current state of the registration of the purchased commodity according to the contents of the commodity list as of this time. The detail screen shows, for example, a list of commodity names, unit price and quantities of the commodities registered as the purchased commodities, a total amount of discount applied to the registered commodities, and a total amount of the registered commodities.

In Act 11, the processor 12 determines whether or not the commodity to be registered as the purchased commodity is designated. Then, if no commodity is designated, the processor 12 takes No, and thus proceeds to the processing in Act 12.

In Act 12, the processor 12 determines whether or not the settlement is instructed. If it is determined that the settlement is not instructed, the processor 12 takes No, and returns to the processing in Act 11.

Thus, the processor 12 stands by until the commodity is designated in Act 11 or the settlement is instructed in Act 12.

The store clerk performs an operation for designating the second and subsequent commodities as the purchased commodities at the time the processor 12 is in the standby state in Act 11 and Act 12 if the customer brings a plurality of commodities to the register counter. After such an operation is performed, the processor 12 takes Yes in Act 11 and executes the processing in Act 8 to Act 10 in the same manner as described above. As a result, the plurality of commodities brought to the register counter by the customer is added to the commodity list, respectively. Since the summary screen does not include an operation element for registering the purchased commodity as described above, the operation for designating the commodity as the purchased commodity is not performed on the touch panel for customer 1. The processor 12 does not use the recognition result of the fixed scanner 2 to register the purchased commodity.

Thus, in response to the operation performed by the store clerk serving as the second operator present on the opposite side of the customer acting as the first operator across the POS terminal 100, the processor 12 determines the contents of the transaction indicating a commodity to which the transaction relates. Thus, the processor 12 executes the information processing according to the information processing program, and in this way, the computer having the processor 12 as the central element functions as a second determining module that makes the above determination.

If the store clerk terminates designation of all of the commodities that the customer brings to the register counter as the purchased commodities, the store clerk instructs a settlement operation through the touch panel for store clerk 9 or the sub touch panel 10 by a predetermined operation. The predetermined operation is, for example, an operation of pressing a customer segment key provided on the keyboard 11. After the corresponding operation is performed, the processor 12 takes Yes in Act 12 and proceeds to the processing in Act 13.

In Act 13, the processor 12 controls the touch panel for customer 1 to display a selection screen. The selection screen displays a plurality of settlement methods to receive an operation for selecting one of the settlement methods by a customer. For example, the selection screen displays a plurality of buttons respectively associated with the plurality of settlement methods. In the present embodiment, the settlement method such as cash, credit, electronic money or a prepaid card can be selectively accepted in the POS terminal 100. Therefore, the selection screen includes four buttons associated with the cash, the credit, the electronic money and the prepaid card, respectively. For the electronic money and the prepaid card, a plurality of buttons respectively associated with a plurality of dedicated settlement services to which the electronic money and the prepaid card belong may be included. Alternatively, if a button associated with the electronic money or the prepaid card is touched, the processor 12 may control the touch panel 1 for customer to display a lower level selection screen showing buttons respectively associated with a plurality of dedicated settlement services belonging to the selected settlement method.

In Act 14, the processor 12 determines whether or not one of the settlement methods is designated. If a specific settlement method is not designated, the processor 12 takes No, and proceeds to the processing in Act 15.

In Act 15, the processor 12 determines whether or not return to the registration for the purchased commodity is instructed. Then, if return to the registration is not instructed, the processor 12 takes No and returns to the processing in Act 14.

In this way, the processor 12 stands by until the settlement method is designated in Act 14 or return to the registration is instructed in Act 15.

If a customer desires to add a purchased commodity, the customer instructs to return to the registration by performing a predetermined operation on the touch panel for customer 1. The customer, for example, touches a return button displayed on the selection screen, as the predetermined operation. On the other hand, the store clerk instructs to return to the registration by performing a predetermined operation on the touch panel for store clerk 9 or the sub touch panel 10 if there is a remaining purchased commodity not yet registered. The store clerk, for example, touches a return button shown on the detail screen or the keyboard screen, as the predetermined operation. After the corresponding operation is performed, the processor 12 takes Yes in Act 15, and executes the processing subsequent to that in Act 9 in the same manner as described above.

When the settlement is performed, the customer designates the settlement method to be used by performing a predetermined operation on the selection screen. The operation is, for example, a touch on a button, displayed on the selection screen, which is associated with the settlement method to be used. After the corresponding operation is performed, the processor 12 takes Yes in Act 14, and proceeds to the processing in Act 31 in FIG. 5.

By the way, if the POS terminal 100 is set to the full self-service mode, the store clerk touches the switching button BU3 shown on the keyboard screen SC1 displayed on the sub touch panel 10. If the switching button BU3 is touched in the standby state in Act 6 and Act 7, i.e., in a state in which the processor 12 waits for the start of registration of the purchased commodity relating to one transaction, the processor 12 takes Yes in Act 7, and proceeds to the processing in Act 16 in FIG. 4.

In Act 16, the processor 12 changes the mode flag to the set state.

In Act 17, the processor 12 controls the touch panel for customer 1 to display a guide screen. The guide screen is used for notifying the customer that he/she should perform the operation of registering the purchased commodity. The guide screen may indicate what kind of operation should be performed as the operation of registering the purchased commodity.

In Act 18, the processor 12 controls the touch panel for store clerk 9 to display the standby screen. Although the standby screen may include any contents, for example, it is assumed that the standby screen shows a screen saver. The standby screen does not include an operation element for registering the purchased commodity.

In Act 19, the processor 12 controls the sub touch panel 10 to display a switching screen. The switching screen shows switching buttons.

Figure 7:
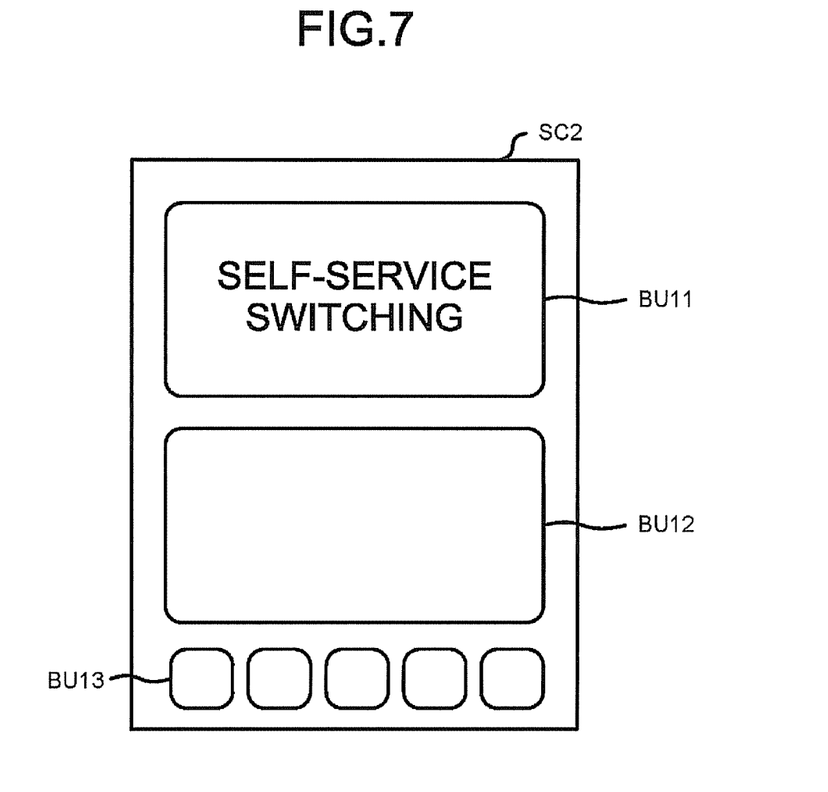
FIG. 7 is a view illustrating a switching screen.

FIG. 7 shows a switching screen SC2 as an example. On the switching screen SC2, a plurality of buttons such as a switching button BU11 and buttons BU12 and BU13 is arranged. Although reference symbols are not applied, buttons having the same shape as the button BU13 are also buttons.

Functions are allocated to the respective buttons on these switching screens SC2 in advance, respectively. The button BU11 is allocated with a function in which the operator instructs switching to the semi-self-service mode. A character string "self-service switching" is shown on the switching button BU11 to indicate the allocated function. A character string indicating the function allocated to each button is also displayed on each of the other buttons, but the character string is not shown in FIG. 7. The switching screen SC2 does not include an operation element for registering the purchased commodity.

The switching button BU11 has a larger display area than the switching button BU3 on the keyboard screen SC1. This is because the operation to be received on the sub touch panel 10 from the operator in the full self-service mode is less as compared with that in the semi-self-service mode, and in this way, the number of buttons required to be displayed on the switching screen SC2 is smaller, and a larger area can be used to display the switching button BU11.

In Act 20, the processor 12 determines whether or not the commodity to be registered as the purchased commodity is designated. Then, if no commodity is designated, the processor 12 takes No, and proceeds to the processing in Act 21.

In Act 21, the processor 12 determines whether or not the switching button BU11 is touched. If it is determined that the switching button BU11 is not touched, the processor 12 takes No and returns to the processing in Act 20.

Thus, the processor 12 stands by until the commodity is designated in Act 20, or the switching button BU11 is touched in Act 21.

The store clerk touches the switching button BU11 shown on the switching screen SC2 displayed on the sub touch panel 10 if he or she wants to set the POS terminal 100 in the semi-self-service mode. If the switching button BU11 is touched at the time the processor 12 is in the standby state in Act 20 and Act 21, i.e., at the time the processor 12 waits for the start of registration of the purchased commodity relating to one transaction, the processor 12 takes Yes in Act 21, and proceeds to the processing in Act 22.

In Act 22, the processor 12 changes the mode flag to the reset state. Then, the processor 12 executes the processing subsequent to Act 3 in the same manner as described above.

As described above, in Act 7 and Act 16, or Act 21 and Act 22, in response to a button operation by the store clerk who acts as the second operator before the determination about the contents of one transaction is started, the processor 12 switches to the determination module that is enabled in determination about the contents of the transaction started thereafter. Thus, the processor 12 executes the information processing according to the information processing program, and in this way, the computer having the processor 12 as the central element functions as a determination control module for performing such switching.

A customer who brings the commodity to the register counter performs an operation for designating the commodity as the purchased commodity, using the touch panel for customer 1 or the fixed scanner 2. The operation of the customer at this time may be the same as that performed by using another existing self-service type POS terminal. If the operation for designating the commodity as the purchased commodity is performed, the processor 12 takes Yes in Act 20, and proceeds to the processing in Act 23.

Since the standby screen does not include an operation element for registering the purchased commodity as described above, an operation for designating the commodity as the purchased commodity is not performed on the touch panel for store clerk 9. Even if the keyboard 11 is operated, the processor 12 does not accept the operation as designation of the purchased commodity. Since the switching screen SC2 does not include an operation element for registering the purchased commodity as described above, the operation for designating the commodity as the purchased commodity is not performed on the sub touch panel 10. Specifically, in the full self-service mode in which the contents of a transaction to be settled are determined in response to the operation performed by a customer who acts as the first operator, the processor 12 disables the touch panel for store clerk 9, the sub touch panel 10 and the keyboard 11, which serve as the second operation devices. Thus, the processor executes the information processing according to the information processing program, and in this way, the computer having the processor 12 as the central element functions as a disablement module. Since the touch panel for store clerk 9, the sub touch panel 10 and the keyboard 11 are disabled in this manner, registration of a commodity erroneously performed as the purchased commodity by the store clerk can be prevented.

In Act 23, the processor 12 updates the commodity list to include the commodity designated by the above operation.

In Act 24, the processor 12 controls the touch panel for customer 1 to display the detail screen. The detail screen shows the details of the current state of registration of the purchased commodity according to the contents of the commodity list as of this time. The detail screen shows, for example, a list of commodity names, unit price and quantities of the commodities registered as the purchased commodities, a total amount of discount applied to the registered commodities, a total amount of the registered commodities.

In Act 25, the processor 12 controls the touch panel for store clerk 9 to display the detail screen. The detail screen to be displayed on the touch panel for store clerk 9 shows that the POS terminal 100 is in the full self-service mode in addition to the same information as that displayed in Act 10. The detail screen to be displayed on the touch panel for store clerk 9 does not include an operation element for registering the purchased commodity.

In Act 26, the processor 12 determines whether or not the commodity to be registered as the purchased commodity is designated. Then, if no commodity is designated, the processor 12 takes No, and proceeds to the processing in Act 27.

In Act 27, the processor 12 determines whether or not the settlement is instructed. If it is determined that the settlement is not instructed, the processor 12 takes No and returns to the processing in Act 26.

Thus, the processor 12 stands by until a commodity is designated in Act 26 or the settlement is instructed in Act 27.

If the customer brings a plurality of commodities to the register counter, the customer performs an operation for designating the second and subsequent commodities as the purchased commodities at the time the processor 12 is in the standby state in Act 26 and Act 27. If such an operation is performed, the processor 12 takes Yes in Act 26 and executes the processing in Act 23 to Act 25 in the same manner as described above. In this way, a plurality of commodities that the customer brings to the register counter is added to the commodity list, respectively. Since the detail screen displayed on the touch panel for store clerk 9 does not include an operation element for registering the purchased commodity as described above, the operation for designating the commodity as the purchased commodity is not performed on the touch panel for store clerk 9. Even if the keyboard 11 is operated, the processor 12 does not accept the operation as designation of the purchased commodity. Since the switching screen SC2 does not include an operation element for registering the purchased commodity as described above, the operation for designating the commodity as the purchased commodity is not performed on the sub touch panel 10.

Thus, the processor 12 determines the contents of the transaction in which the commodity of which category is purchased in the transaction in response to the operation performed by the customer who acts as the first operator. Thus, the processor 12 executes the information processing according to the information processing program, and in this way, the computer having the processor 12 as the central element functions as a first determining module that makes the above determination.

After designating all commodities that the customer brings to the register counter as the purchased commodities, the customer instructs settlement by performing a predetermined operation on the touch panel for customer 1. The operation is performed such that, for example, a button included in the detail screen displayed on the touch panel for customer 1 is touched. If the corresponding operation is performed, the processor 12 takes Yes in Act 27, and proceeds to the processing in Act 28.

In Act 28, the processor 12 controls the touch panel for customer 1 to display a selection screen the same as that displayed in Act 13.

In Act 29, the processor 12 determines whether or not a settlement method is designated. If the settlement method is not designated, the processor 12 takes No, and proceeds to the processing in Act 30.

In Act 30, the processor 12 determines whether or not an instruction to return to the registration of the purchased commodity is made. Then, if the corresponding instruction is not made, the processor 12 takes No and returns to the processing in Act 29.

Thus, the processor 12 stands by until the settlement method is designated in Act 29 or the instruction to return to the registration is made in Act 30.

If a customer wants to add a purchased commodity, the customer instructs to return to registration by performing a predetermined operation on the touch panel for customer 1. The operation is performed such that, for example, a return button displayed on the selection screen is touched. If the corresponding operation is performed, the processor 12 takes Yes in Act 30, and executes the processing subsequent to Act 24 in the same manner as described above.

If the customer wants to perform settlement, the customer designates a settlement method to be used by performing a predetermined operation on the selection screen. The operation is performed such that, for example, a button, displayed on the selection screen is touched, which is associated with the settlement method to be used. If the corresponding operation is performed, the processor 12 takes Yes in Act 29, and proceeds to the processing in Act 31 in FIG. 5.

As described above, the processor 12 proceeds to the processing in Act 31 in FIG. 5 if it is determined that the settlement method is designated in Act 14 at the time the POS terminal is in the semi-self-service mode or in Act 29 at the time the POS terminal is in the full self-service mode.

In Act 31, the processor 12 controls the touch panel for customer 1 to display a settlement screen. The settlement screen shows a settlement amount and a guide for providing an operation method for settlement. A plurality of settlement screens respectively corresponding to a plurality of settlement methods is prepared in advance. The processor 12 controls the touch panel for customer 1 to display a settlement screen corresponding to the designated settlement method. Therefore, at the time of displaying the settlement screen, the processor 12 calculates a settlement amount for the sales of the purchased commodity registered in the commodity list.

In Act 32, the processor 12 controls the touch panel for store clerk 9 to display a detail screen. The detail screen may be the same as the detail screen displayed in Act 10 or Act 25. However, the detail screen to be displayed in Act 32 shows that the settlement is being performed by the customer.

In Act 33, the processor 12 starts a settlement device corresponding to the designated settlement method. For example, if a cash payment is designated as a settlement method, the processor 12 starts the coin unit 3 and the bill unit 4. If a credit payment is designated as a settlement method, the processor 12 starts the credit card reader 5. Further, if an electronic money payment is designated as a settlement method, the processor 12 starts the near field communication unit 6. If a prepaid card payment is designated as a settlement method, the processor 12 starts the prepaid card reader/writer 7.

In Act 34, the processor 12 stands by until an operation for settlement according to the designated settlement method is performed. For example, if the cash payment is designated as the settlement method, the processor 12 takes Yes when coins and bills are inserted into the coin unit 3 and the bill unit 4, respectively. If the credit payment is designated as the settlement method, the processor 12 takes Yes when the credit card is slid through the slit 5a of the credit card reader 5. Further, if the electronic money payment is designated as the settlement method, the processor 12 takes Yes when a wireless tag for electronic money is held close to the near field communication unit 6. If the prepaid card payment is designated as the settlement method, the processor 12 takes Yes when a prepaid card is inserted in the slot 7a of the prepaid card reader/writer 7. If the processor 12 takes Yes in Act 34, the processor 12 proceeds to the processing in Act 35.

In Act 35, the processor 12 performs a settlement processing. Specifically, the processor 12 executes, for example, a settlement processing for the settlement amount calculated in Act 31, using the designated settlement method in a well-known manner. Thus, the processor 12 executes the information processing according to the information processing program, and in this way, the computer having the processor 12 as the central element functions as a settlement module.

In Act 36, the processor 12 stops the settlement device started in Act 33.

In Act 37, the processor 12 controls the receipt printer 8 to issue a receipt by printing a receipt image indicating the contents of the transaction settled this time and the settlement result on the receipt paper.

In Act 38, the processor 12 clears the contents of the commodity list.

In Act 39, the processor 12 controls the touch panel for customer 1 to display a termination screen. The termination screen notifies the customer of completion of the transaction.

In Act 40, the processor 12 determines whether or not the mode flag is in the reset state. If the mode flag is in the reset state, the processor 12 takes Yes and returns to the processing in Act 3 in FIG. 3. If the mode flag is in the set state, the processor 12 takes No and returns to the processing in Act 17 in FIG. 4.

If an event in which maintenance such as replacing of receipt paper or replenishment or collection of money is required occurs, the processor 12 performs control to display an error screen for notifying that maintenance is required. If the mode flag is in the reset state, i.e., the POS terminal is in the semi-self-service mode, the processor 12 controls the touch panel for store clerk 9 to display an error screen for store clerk. According to the error screen, the store clerk performs maintenance. If the mode flag is in the set state, i.e., the POS terminal is in the full self-service mode, the processor 12 controls the touch panel for customer 1 to display an error screen for customer. Furthermore, if the POS terminal is in the full self-service mode, the processor 12 also controls the touch panel for store clerk 9 to display an error screen for store clerk. The error screen for store clerk includes a cancel key for canceling the display of the error screen. The customer calls the store clerk according to the display of the error screen for customer. The called store clerk confirms the event through the error screen for store clerk to perform maintenance as appropriate, and instructs cancellation of display of the both error screens, using the cancel key. In response to the instruction, the processor 12 cancels the display of the both error screens. Thus, the processor 12 executes the information processing according to the information processing program, and in this way, the computer having the processor 12 as the central element functions as the display control module.

As described above, according to the POS terminal 100, the processor 12 performs the settlement and related processing by executing the processing in Act 13 to Act 15 and Act 31 to Act 39 after the registration of the purchased commodity in Act 3 to Act 12. As a result, the registration is performed by the operation performed by the store clerk, and the settlement is performed by the operation performed by the customer, respectively, and in this way, the semi-self-service mode is realized. On the other hand, the processor 12 performs the settlement and related processing by executing the processing in Act 28 to Act 39 after the registration of the purchased commodity in Act 17 to Act 27. As a result, the registration and settlement are both performed by the operation performed by the customer, and the full self-service mode is realized. The processor 12 switches the semi-self-service mode to the full self-service mode and vice versa in response to a touch operation on the switching button BU3 or the switching button BU11. Thus, the POS terminal 100 can easily switch the full self-service state to the semi-self-service state and vice versa.

According to the POS terminal 100, since the purchased commodity is not registered according to the operation on the touch panel for customer 1 and the fixed scanner 2 in the semi-self-service mode, the purchased commodity is not erroneously registered by the customer through the touch panel for customer 1 and the fixed scanner 2.

According to the POS terminal 100, since the purchased commodity is not registered according to the operation on the touch panel for store clerk 9, the sub touch panel 10 and the keyboard 11 in the full self-service mode, the purchased commodity is not erroneously registered by the store clerk through the touch panel for store clerk 9, the sub touch panel 10 and the keyboard 11.

The present embodiment can be modified as follows.

The registration settlement apparatus of another type such as a cash register is applicable in the same manner as in the above embodiment.

A switching button for switching from the semi-self-service mode to the full self-service mode and a switching button for switching from the full self-service mode to the semi-self-service mode may be the same button.

The switching button may be displayed on the screen of the touch panel for store clerk 9 or on the keyboard 11.

The processor 12 may switch from the semi-self-service mode to the full self-service mode only in a state in which a responsible person of the operation is being registered.

When the processor 12 switches from the semi-self-service mode to the full self-service mode, the processor 12 may record the switching of the mode in electronic journal. At this time, the processor 12 may also record a name or an identification code of the responsible person of the operation in the electronic journal.

When the processor 12 switches from the semi-self-service mode to the full self-service mode, the processor 12 may display a message such as "Do you want to switch to the full self-service mode?" and meanwhile display a confirmation screen showing a "Yes" button and a "No" button on the touch panel for store clerk 9 or the sub touch panel 10 in a pop-up manner. Then, the processor 12 switches the mode if the "Yes" button is touched, or does not switch the mode if the "No" button is touched.

If an error in a state in which the coin unit 3 and the bill unit 4 are not connected occurs, the processor 12 may not switch the mode. Then, in this case, the processor 12 may display on the touch panel for store clerk 9 or the sub touch panel 10 a screen showing a warning message such as "Mode cannot be switched. Change machine is not connected".

When the processor 12 switches from the semi-self-service mode to the full self-service mode, the processor 12 may automatically input a predetermined number such as "999" as a number of the responsible person of the operation.

The processor 12 may turn off an automatic cancellation function for the responsible person when the processor 12 switches from the semi-self-service mode to the full self-service mode. The automatic cancellation function for the responsible person is a function of automatically canceling a responsible person registration state by deleting the responsible person number being set if no operation is made for a predetermined time.

Before or after the processor 12 switches from the full self-service mode to the semi-self-service mode, the processor 12 may control the touch panel for store clerk 9 or the sub touch panel 10 to display a screen for prompting the store clerk to input the responsible person number. The processor 12 then inputs the responsible person number in response to an operation performed by the store clerk on this screen.

When the processor 12 switches from the full self-service mode to the semi-self-service mode, the processor 12 may record the switching of the mode in electronic journal. At this time, the processor 12 may also record a name or an identification code of the responsible person in the electronic journal.

When the processor 12 switches from the full self-service mode to the semi-self-service mode, the processor 12 may display a message such as "Do you want to switch to the semi-self-service mode?" and meanwhile display a confirmation screen showing a "Yes" button and a "No" button on the touch panel for store clerk 9 or the sub touch panel 10 in a pop-up manner. Then, the processor 12 switches the mode if the "Yes" button is touched, or does not switch the mode if the "No" button is touched.

When the processor 12 switches from the full self-service mode to the semi-self-service mode, the processor 12 may confirm the state of the coin unit 3 and the bill unit 4. If an error in a state in which the coin unit 3 and the bill unit 4 are not connected occurs, the processor 12 may display a screen showing a message such as "Drawer in operation" on the touch panel for store clerk 9 or the sub touch panel 10.

The processor 12 may display a message indicating the state of the semi-self-service mode on a screen displayed on the touch panel for store clerk 9 if the semi-self-service mode is being set.

The processor 12 may turn on the automatic cancellation function for the responsible person of the operation when the processor 12 switches from the full self-service mode to the semi-self-service mode.

In the full self-service mode, the processor 12 may print "self" as a name of the responsible person of the operation on the receipt.

In the full self-service mode, the processor 12 may record a predetermined number such as "999" as the responsible person number in the electronic journal. In this case, the processor 12 may set "self" as the name of the responsible person at the time of referring to the journal.

In the full self-service mode, the processor 12 may indicate "self" as the name of the responsible person on the screen displayed on the touch panel for store clerk 9 or the sub touch panel 10.

The processor 12 may prohibit or invalid the use of the responsible person number used in the full self-service mode as the responsible person number in the semi-self-service mode.

In the full self-service mode, the processor 12 may adopt a predetermined customer layer as customer layer information.

In the semi-self-service mode, the processor 12 may adopt a customer layer associated with customer layer key pressed by the store clerk after registering the commodity as the customer layer information.

A part or all of functions, realized by the processor 12 which executes the information processing according to the program, may be realized by hardware such as a logic circuit which executes the information processing without the program. The above-described functions may also be realized by combining a software control with the above hardware.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A registration settlement apparatus, comprising:
 a first determining module configured to determine contents of a transaction to be settled in response to an operation performed by a first operator;
 a second determining module configured to determine contents of the transaction in response to an operation performed by a second operator on another side of the registration settlement apparatus;
 a determination control module configured to control the first determining module and the second determining module so as to enable either one of the first determining module and the second determining module, and to switch to the determining module that is enabled for the determination on contents of a transaction started thereafter in response to a button operation by the second operator before the determination on contents of one transaction is started; and
 a settlement module configured to perform a settlement processing of calculating a settlement amount based on the contents of the transaction determined by the first or second determining module enabled by the determination control module, and settling the calculated settlement amount in response to an operation performed by the first operator.

2. The registration settlement apparatus according to claim 1, further comprising:
 a first operation device configured to receive the operation performed by the first operator;
 a second operation device configured to receive the operation performed by the second operator; and
 a disablement module configured to disable the second operation device if the determination control module enables the first determining module, or to disable the first operation device if the determination control module enables the second determining module.

3. The registration settlement apparatus according to claim 1, further comprising:
 a first display device configured to provide information to the first operator;
 a second display device configured to provide information to the second operator; and
 a display control module configured to control both the first display device and the second display device to indicate showing that maintenance of the registration settlement apparatus is necessary on the first and second display devices if the determination control module enables the first determining module, or to control only the second display device to indicate that maintenance of the registration settlement apparatus is necessary only on the second display device if the determination control module enables the second determining module.

4. The registration settlement apparatus according to claim 2, further comprising:
 a first display device configured to provide information to the first operator;
 a second display device configured to provide information to the second operator; and
 a display control module configured to control both the first display device and the second display device to indicate that maintenance of the registration settlement apparatus is necessary on the first and second display devices if the determination control module enables the first determining module, or to control only the second display device to indicate that maintenance of the registration settlement apparatus is necessary only on the second display device if the determination control module enables the second determining module.

5. The registration settlement apparatus according to claim 3, wherein
 the second display device comprises the button.

6. The registration settlement apparatus according to claim 4, wherein
 the second display device comprises the button.

7. The registration settlement apparatus according to claim 1, wherein the first determining module comprises a scanner.

8. The registration settlement apparatus according to claim 1, wherein the settlement module comprises a credit card reader.

9. The registration settlement apparatus according to claim 1, wherein the registration settlement apparatus is a POS terminal.

10. A method for performing settlement by a registration settlement apparatus, comprising:

determining contents of a transaction to be settled in response to an operation performed by a first operator;

determining contents of the transaction in response to an operation performed by a second operator on another side of the registration settlement apparatus;

enabling either one of the determining of the first operator and the determining of the second operator;

switching to the determining enabled for determining contents of a transaction started thereafter in response to a button operation by the second operator before the determination on contents of one transaction is started;

calculating a settlement amount based on the contents of the transaction determined by the determining of the first operator and the determining of the second operator; and settling the calculated settlement amount in response to an operation on the registration settlement apparatus performed by the first operator.

11. The method according to claim 10, further comprising:

a first operation device configured to receiving the operation performed by the first operator;

a second operation device configured to receiving the operation performed by the second operator; and disabling the second operator if determining contents by the first operator, or disabling the first operator if determining contents by the second operator.

12. The method according to claim 10, further comprising:

providing information to the first operator;

providing information to the second operator; and showing that maintenance of the registration settlement apparatus is necessary.

13. A registration settlement system, comprising:

a server; and a plurality of registration settlement devices coupled to the server, each registration settlement device comprising:

a first determining module configured to determine contents of a transaction to be settled in response to an operation performed by a first operator;

a second determining module configured to determine contents of the transaction in response to an operation performed by a second operator on another side of the registration settlement apparatus;

a determination control module configured to control the first determining module and the second determining module so as to enable either one of the first determining module and the second determining module, and to switch to the determining module that is enabled for the determination on contents of a transaction started thereafter in response to a button operation by the second operator before the determination on contents of one transaction is started; and a settlement module configured to perform a settlement processing of calculating a settlement amount based on the contents of the transaction determined by the first or second determining module enabled by the determination control module, and settling the calculated settlement amount in response to an operation performed by the first operator.

14. The registration settlement system according to claim 13, each registration settlement device further comprising:

a first operation device configured to receive the operation performed by the first operator;

a second operation device configured to receive the operation performed by the second operator; and a disablement module configured to disable the second operation device if the determination control module enables the first determining module, or to disable the first operation device if the determination control module enables the second determining module.

15. The registration settlement system according to claim 13, each registration settlement device further comprising:

a first display device configured to provide information to the first operator;

a second display device configured to provide information to the second operator; and a display control module configured to control both the first display device and the second display device to indicate showing that maintenance of the registration settlement apparatus is necessary on the first and second display devices if the determination control module enables the first determining module, or to control only the second display device to indicate that maintenance of the registration settlement apparatus is necessary only on the second display device if the determination control module enables the second determining module.

16. The registration settlement system according to claim 14, each registration settlement device further comprising:

a first display device configured to provide information to the first operator;

a second display device configured to provide information to the second operator; and a display control module configured to control both the first display device and the second display device to indicate that maintenance of the registration settlement apparatus is necessary on the first and second display devices if the determination control module enables the first determining module, or to control only the second display device to indicate that maintenance of the registration settlement apparatus is necessary only on the second display device if the determination control module enables the second determining module.

17. The registration settlement system according to claim 15, wherein the second display device comprises the button.

18. The registration settlement system according to claim 16, wherein the second display device comprises the button.

19. The registration settlement system according to claim 1, wherein the first determining module comprises a scanner.

20. The registration settlement system according to claim 1, wherein the settlement module comprises a credit card reader.

* * * * *